United States Patent [19]
Duncan, Jr.

[11] Patent Number: 5,547,925
[45] Date of Patent: Aug. 20, 1996

[54] LOW TOXICITY TERPENE DRILLING FLUID AND DRILLING FLUID ADDITIVE

[75] Inventor: William M. Duncan, Jr., Nueces County, Tex.

[73] Assignee: Integrity Industries, Inc., Kingsville, Tex.

[21] Appl. No.: 200,677

[22] Filed: Feb. 23, 1994

Related U.S. Application Data

[63] Continuation-in-part of Ser. No. 142,953, Oct. 29, 1993, abandoned, which is a continuation of Ser. No. 950,491, Sep. 25, 1992, abandoned.

[51] Int. Cl.[6] ............................................... C09K 7/02
[52] U.S. Cl. ................................. 507/103; 507/905
[58] Field of Search ................................. 507/103, 905

[56] References Cited

U.S. PATENT DOCUMENTS

| | | | |
|---|---|---|---|
| 2,604,448 | 7/1952 | Wilson | 507/103 |
| 4,409,108 | 10/1983 | Carney et al. | 507/103 |
| 5,010,109 | 4/1991 | Inoi | 514/714 |

Primary Examiner—Philip Tucker
Attorney, Agent, or Firm—G. Turner Moller

[57] ABSTRACT

A water based drilling fluid comprises 1–8% of an additive comprising saturated terpene, a mixture of saturated terpenes or a mixture of saturated and unsaturated terpenes. The drilling fluid is substantially non-toxic and has an LC-50 greater than 30,000 ppm and preferably greater than 100,000 ppm. The most economic additives are a mixture of saturated and unsaturated terpenes and have at least 30% saturated terpenes. The drilling fluid has the advantage of low toxicity over unsaturated terpene drilling fluids.

17 Claims, 1 Drawing Sheet

– – – 48 hr rangefinder (3% blend in generic drilling fluid)
———— 96 hr definitive test (2% blend in generic drilling fluid)

LOW TOXICITY TERPENE DRILLING FLUID AND DRILLING FLUID ADDITIVE

This application is a continuation-in-part of copending application Ser. No. 08/142,953, filed Oct. 29, 1993, now abandoned which is a continuation of application Ser. No. 07/950,491, filed Sep. 25, 1992, now abandoned.

This invention relates to a drilling fluid and a drilling fluid additive.

Drilling fluids used to drill wells into the earth are commonly called drilling muds because the original drilling fluid was simply water that mixed with clays in the earth to produce a thin mud. Typically, drilling mud is pumped down the drill string, through nozzles in the end of the bit and then upwardly in the annulus between the drill string and the wall of the bore hole. Drilling mud has a variety of functions and must accordingly have comparable capabilities. Cuttings generated by the bit are moved away from the bottom of the hole and then upwardly through the annulus to the surface to present a clean rock face to be drilled. The bit is cooled and lubricated by the drilling mud. The pressure of fluids in the formations penetrated by the bit is substantially counterbalanced by the hydrostatic weight of the mud column in the hole. The drilling mud is modified to prevent undue effects on the bore hole wall, e.g. shale swelling. In water based muds, materials are added to prevent undue water loss into permeable formations penetrated by the bit. Various materials are added to reduce friction between the drill string and the bore hole wall. Those skilled in the art realize an almost endless list of substances have been added to drilling mud for a variety of reasons.

Some commonly used mud systems or mud additives create obvious environmental problems. An aggravated example is oil based drilling fluid which creates oil contaminated cuttings requiring cuttings and reserve pit contents to be handled in a careful, expensive disposal technique. The used drilling mud is transported to a clean up facility where it is reconditioned for reuse.

Offshore problems are much worse than onshore problems because many drilling fluids are lethal to sea life. In addition, it is much more expensive to transport and dispose of the volume of cuttings, reserve pit contents and used drilling mud. Some additives are deemed environmentally safe accordingly to present parameters such as biodegradability, persistence in the environment and toxicity to living organisms. Specific testing procedures have been established by the U.S. Environmental Protection Agency and other appropriate governmental bodies to quantitatively measure some of these parameters in relation to drilling fluid additives. One such test for toxicity is published in the Federal Register, Volume 50, No. 165, Aug. 26, 1985 (34627–34636) and is known in the art as the LC-50 test. LC-50 is also shorthand for the suspended particulate phase (SPP) concentration that will kill 50% of the subjects. The SPP concentration is one part drilling mud in nine parts artificial sea water. In this test, Mysid shrimp (Mysidopsis bahia) are placed in clean artificial sea water containing various percentages of the SPP. If 30,000 ppm, which is 3% or less concentration of the SPP in clean sea water kills 50% of the shrimp, then the drilling fluid is deemed toxic and cannot be used offshore, except in so-called closed loop systems where all fluid and cuttings are contained and returned to shore and disposed of. If the LC-50 of the SPP is greater than 30,000 ppm, which is 3%, it is believed environmentally safe and can be discharged over the side of an offshore drilling rig. For reasons of prudence, most operators prefer to use fluids with >100,000 ppm LC-50 readings. Because shrimp are fairly fragile subjects which often seem to die for no reason, this test is exceedingly difficult to pass.

In several countries, including the United States and countries bordering the North Sea, drilling fluid systems must pass tests of this type before they can be disposed of outside of a licensed disposal facility. Typical regulations are much more strict for offshore and wetlands drilling than for inland drilling. It is very expensive to contain cuttings, reserve pit contents and used drilling fluid in a "closed loop system" offshore where these materials are hauled to shore for disposal. If a drilling fluid could pass the specified toxicity tests, then the cuttings and excess or used drilling fluid could be discharged into the water without significant damage to sea life and without fear of fines or other legal action. The cost of almost any mud additive is a small fraction of the cost of hauling cuttings and used drilling fluid to shore for disposal. Accordingly, a drilling fluid which passes current toxicity tests is very appealing.

It is known in the art to use a terpene or terpene blend in a water based mud system to enhance the rate of penetration, improve mud properties and stabilize the well bore as shown in copending application Ser. No. 07/950,491, filed Sep. 25, 1992. It is also known to place a small amount of d-limonene, a well known terpene, in drilling mud as a fragrant to mask other odors as shown in U.S. Pat. No. 4,409,108. It is commonly believed by those experienced with terpene chemistry that terpenes cannot pass the LC-50 toxicity test. This is shown by statements made by technical representatives of terpene manufacturers and by published statements of those skilled in the art. There is no doubt this is true as to unsaturated terpenes. A report of the *Houston Driller*, January 1993, page 2 reports that the drilling fluid used by Enron Oil & Gas in Webb County will not pass federal LC-50 tests. It is known from other sources that this material contains d-limonene.

It has been discovered that unsaturated terpenes can be converted by hydrogenation into compounds that pass LC-50 toxicity tests. Tests show that blends of hydrogenated and unhydrogenated terpenes pass LC-50 tests when tested at 2% concentrations in some generic mud systems. Economical blends of hydrogenated and unhydrogenated terpenes having at least 30% hydrogenated terpenes have passed LC-50 tests. Surprisingly, the hydrogenated terpenes and blends of hydrogenated terpenes and unhydrogenated terpenes produce drilling fluids that compare favorably with drilling fluids containing only unhydrogenated terpenes. Examples of hydrogenated terpenes are:

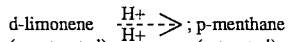

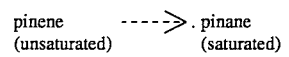

Another substantial advantage of hydrogenated terpenes is they are also substantially less odoriferous than their unhydrogenated counterparts. While the smell of terpene drilling muds may only be slightly aggravating on shore, inside an enclosed mud room on an offshore platform, the smell can be overpowering. The saturated terpenes, particularly pinane and p-menthane are much less odoriferous than their counterparts and thus advantageous.

It is an object of this invention to provide an improved drilling fluid additive and drilling fluid that will pass current toxicity tests.

Another object of this invention is to provide a terpene or terpene blend in a water based drilling fluid system that will pass current toxicity tests and retain the high penetration rates and other advantages of terpene type mud systems.

These and other objects of this invention will become more fully apparent as this description proceeds.

Figure 1:
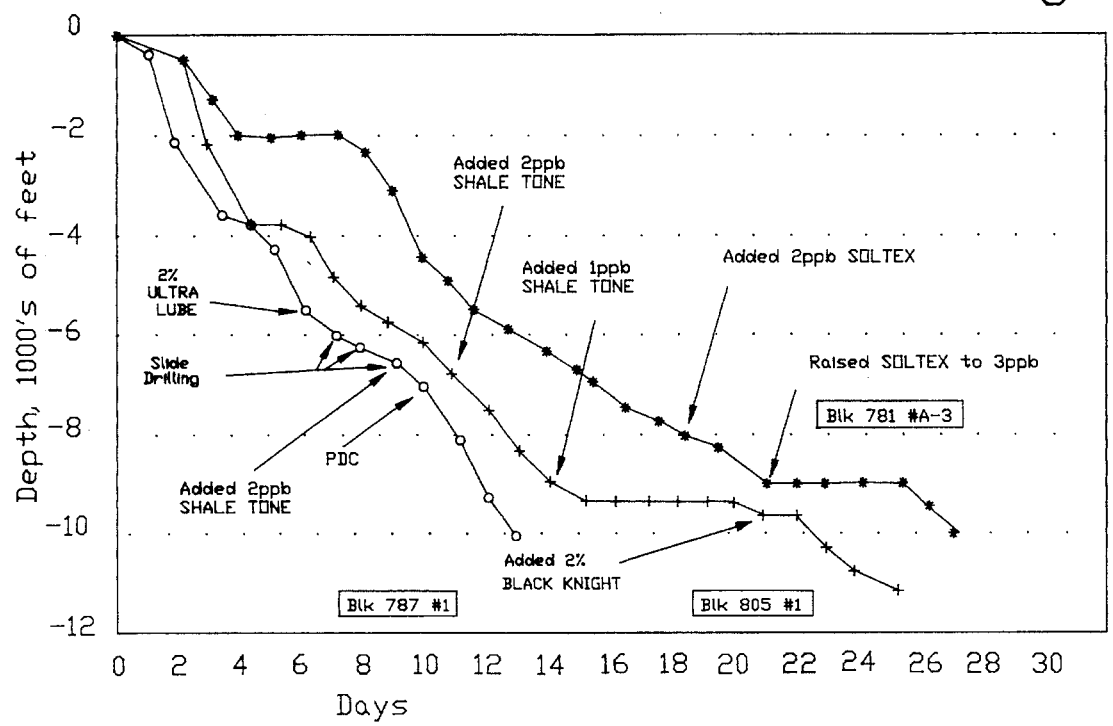
FIG. 1 is a drilling rate graph comparing wells drilled offshore near Mustang Island, Texas with conventional muds and a well drilled with a water based drilling mud of this invention.

The drilling fluid of this invention is water based, either fresh water or brine, and may have therein a variety of additives for a variety of different purposes, most of which will be recognized by those skilled in the art. As a general rule, water based drilling fluids include a viscosifier to make the liquid thick enough to carry cuttings, a water loss control material to reduce the loss of water in the drilling fluid to permeable formations encountered in the well, pH control materials for increasing the pH of the drilling mud and thereby reducing shale swelling, weight material for increasing the density of the drilling fluid and thereby increasing the hydrostatic weight of a column of the drilling fluid to control the pressures of the formations encountered and a variety of specialized additives such as lubricants or other specialized materials.

The standard viscosifier used in drilling muds is bentonite which is often called gel. Other materials, such as a polymer known as XCD, made by Kelco Rotary, are also commonly used. Bentonite is a naturally occurring swellable clay and has been used for decades as the standard viscosifier in drilling muds. The purpose of raising the viscosity is to enable the drilling fluid to carry cuttings upwardly in the hole. Another advantageous side effect of bentonite as a viscosifier is that when the mud is quiescent, it forms a thick gel or semi-solid from which cuttings do not readily fall out.

There are many water loss control materials used or suggested for use in drilling fluids. Bentonite has a water loss control capability, to a point, because the swollen clay particles are swept onto the face of a permeable formation by escaping water to produce a soft, gummy filter cake which somewhat retards water loss into a permeable formation. Powdered lignite, sodium polyacrylates, sulfonated asphalt, polyanionic cellulose and other materials have long been used as water loss control materials. When added in proper proportions to a water based, bentonite mud system, the water loss to permeable formations can be reduced to tolerable amounts.

It is normally desirable that drilling muds have a high pH to control shale swelling and for other reasons. Caustic soda is almost universally used for this purpose.

The standard weight material used in drilling muds is powdered barite which is barium sulfate. Hematite or iron oxide is also used in some circumstances. Unweighted mud systems typically exhibit a density of about 9.5 pounds/gallon or less, up from 8.3 pounds/gallon for fresh water. The increase in density is largely caused by small cuttings suspended in the drilling mud. To achieve mud densities above about 9.5 pounds/gallon, weight material is added.

The additive of this invention fall into a category of specialized materials that are added to water based drilling fluids for a variety of more subtle reasons than those mentioned above. Even though more subtle, the effects can be dramatically important. In land drilling, terpenes have advantageously been added to water based drilling fluids to increase penetration rate and to provide a suitable cost effective replacement for oil based drilling fluids to avoid disposal problems and expenses. For example, for several years, there has been more natural gas produced in Webb County than in any other county in Texas. Although the exact amount varies, production is in the neighborhood of 25 billion cubic feet per month. Almost all natural gas produced from Webb County, Tex. is from a Lower Wilcox Formation locally known as the Lobo. Although the rig count in Webb County varies somewhat, 15–20 rigs have been continuously drilling Lobo wells in Webb County for at least ten years. Prior to the introduction of terpene drilling fluids in late 1991, oil based muds were exclusively used to drill Lobo wells in Webb County after protection pipe was set. At the present time, almost all Lobo wells in Webb County are drilled below protection pipe with terpene drilling muds. Thus, terpene drilling muds have replaced oil based muds below protection pipe in drilling Lobo wells in Webb County. This is not an accident or a quirk or a mirage or smoke and mirrors. It has occurred because, all things considered, terpene drilling fluids are more cost effective than oil based drilling fluids. The overwhelming advantages of terpene drilling fluids are: faster penetration rates, reduction in torque and drag, lower costs and reduced environmental costs.

In offshore and wetlands drilling, the low toxicity terpene drilling fluid of this invention offers the advantages of high penetration rates and low toxicity so cuttings and excess drilling fluid may be discharged into the water rather than hauled to shore for disposal.

EXAMPLE 1

On a Webb County, Tex. well, 2% by volume terpene blend (54% hydrogenated, 46% unsaturated) was added to the water based mud system. The rate of penetration immediately increased from 17 feet/hour to 55 feet/hour. Because there was no change in lithology, i.e. the character of the rock, the increase in penetration rate was attributed to the additive. The well interval of 7500' to total depth at 9500' was drilled with no problems and with an average penetration rate of 48 ft/hour.

EXAMPLE 2

On an offshore well in the Gulf of Mexico, 2% by volume terpene blend (54% saturated, 46% unsaturated) was added to the water based mud system. A drilling rate graph is shown in FIG. 1 comparing the #1 Block 787, #1 Block 805 and the #A-3 Block 781. The well immediately began drilling faster and the well was control drilled at 60 feet/hour which was less than the maximum achievable penetration rate. The well was drilled to total depth without any of the problems, i.e. stuck drill pipe, high torque and drag, experienced on offset wells. The well was drilled in record time for the field as shown in FIG. 1. No odor problems were reported.

In FIG. 1, the phrase 2% ULTRA LUBE means that the 2% terpene blend was added at this time. "ppb" means pounds per barrel of mud in the circulating system. SHALE TONE, SOLTEX and BLACK KNIGHT are commercially available mud additives. "PDC" is the name of a type of commercially available bit.

EXAMPLE 3

Figure 2:
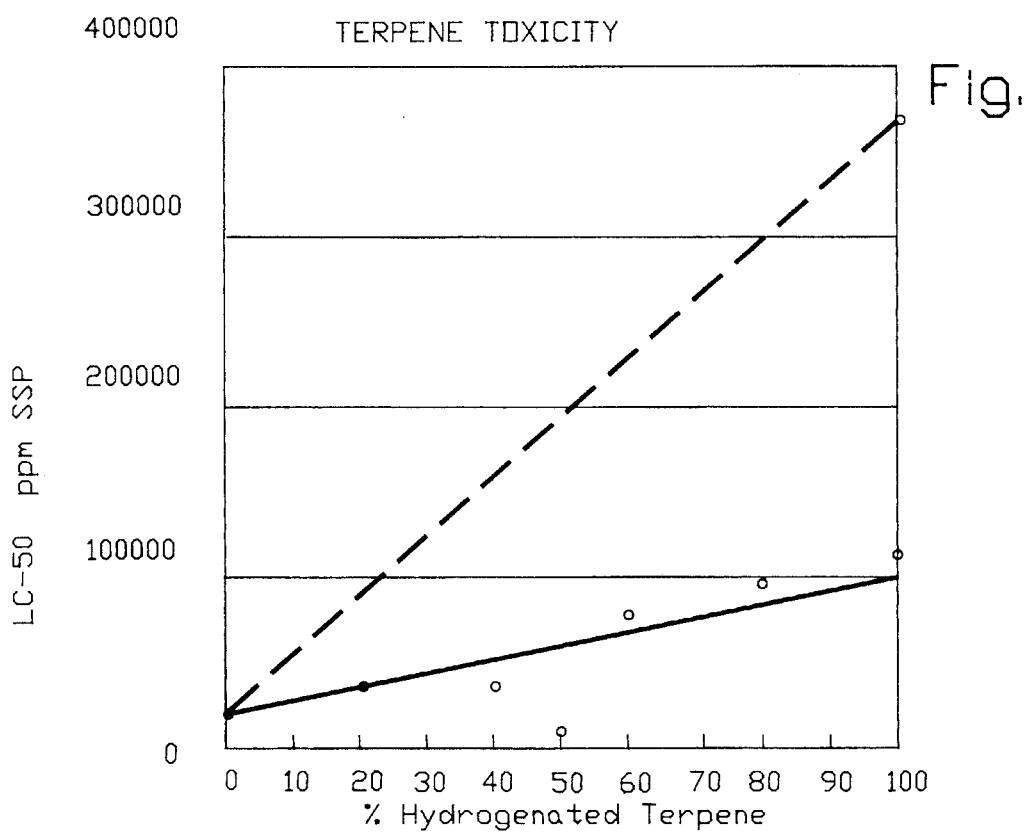
FIG. 2 is a graph showing the effect of hydrogenated terpene compounds on the toxicity of terpene drilling fluids.

Saturated and unsaturated terpenes were blended at various ratios and then added at 2% by volume and at 3% by volume to a water based drilling fluid with a base LC-50 of 1,000,000 ppm. This means that 50% of the subject shrimp would live in a 100% SPP solution of the drilling fluid prior to the addition of the terpene blend. The mud system was retested after addition of the blends and the results are shown in FIG. 2.

The vertical axis of the graph is the amount in parts per million of the suspended particulate phase (SPP) concentration that will kill 50% of the subjects. The suspended particulate phase is prepared by mixing 2% and 3% respectively of the terpene blend with the generic mud and then added in a 1:9 ratio to artificial sea water and mixed. Although the 96 hour test is considered more definitive, results of 96 hour and 48 hour tests should be comparable. The conclusions from the graph are (1) the higher percentage of saturated terpene in the terpene blend, the higher the LC-50 and (2) the higher percentage of terpene blend in the drilling fluid, the lower the LC-50.

EXAMPLE 4

A totally saturated terpene blend, i.e. 100% hydrogenated terpenes, was added at 2% by volume in a generic water based mud system. The LC-50 of the mud system was then tested and found to be 350,000 ppm which passes EPA requirements. This means that half of the shrimp live in a solution of 350,000 ppm SPP drilling fluid. An unsaturated terpene blend was tested in the same mud system under the same laboratory conditions. The LC-50 of the mud system was less than 30,000 ppm SPP drilling fluid.

EXAMPLE 5

A controlled drilling test was conducted under laboratory conditions with a drilling simulator. A block of shale was drilled using an actual oil field drill bit under dynamic circulating conditions with a water based mud system. The addition of 2% by volume of a terpene blend (54% saturated, 46% unsaturated) to the drilling fluid caused the penetration rate to more than double. All other conditions were kept constant.

EXAMPLE 6

A controlled drilling test was conducted under laboratory conditions with a drilling simulator. A block of shale was drilled using an actual oil field bit under dynamic circulating conditions with a water based mud system. The addition of 2% by volume of pinane, which is 100% saturated, to the drilling fluid caused the rate of penetration to more than double. All other conditions were kept constant.

EXAMPLE 7

On a Zapata County, Tex. well, 2% by volume terpene blend containing 80% pinane and 20% pinene was added to the water based mud system. The rate of penetration immediately increased from 20'/hour to 47'/hour. Because there was no lithology change, the increase in penetration rate was attributed to the additive. No unpleasant or strong odors were detected during the use of pinane. On previous wells in this field, unsaturated terpene blends were used to increase the rate of penetration. During the drilling of these earlier wells, several rig personnel experienced dizziness and nausea due to the odor of the unsaturated blend.

EXAMPLE 8

On an offshore well in the Gulf of Mexico, 3% by volume terpene blend (60% saturated, 40% unsaturated) was added to the water based mud system. An immediate increase in penetration rate resulted and was maintained with further additions of the blend. The rig had an enclosed mud room (indoor surface pit for circulating drilling fluid) and odor accumulation was a major concern. No adverse affects or strong odors were detected and the well was drilled to completion in record time with no fluid related problems.

EXAMPLE 9

A saturated terpene blend was tested for environmental safety according to protocol established by the Ministry of Agriculture, Fisheries and Food (MAFF) Laboratory in the United Kingdom for drilling fluid additives used in the North Sea. The tests included biodegradability testing, adsorbability testing, and multi-species LC-50 toxicity testing. The results of these tests were submitted to the MAFF which subsequently approved use of the blend and the discharge of 50 tonnes per year per point discharge in the North Sea. Test results on unsaturated terpene blends were less favorable and indicated that their use in the North Sea would be severely restricted.

The drilling fluid additive of this invention is a hydrogenated terpene, a mixture of hydrogenated terpenes or a mixture of hydrogenated and unhydrogenated terpenes. The unsaturated terpene may be monocyclic, preferably d-limonene, pinene, dipentene or mixtures thereof. These materials are readily commercially available. Other monocyclic unsaturated terpenes are also effective, such as p-cymene, 1,3-p-menthadiene, 2,4-p-menthadiene, 1(7),8-p-menthadiene, 2,8-p-menthadiene, 3,8-p-menthadiene and 1(7),2-p-menthadiene. The cyclic terpene may be bicyclic, such as pinene, 2-carene, 3-carene (also known as delta-3-carene) and 3(10)-carene.

The saturated terpenes may either be natural saturated terpenes or naturally unsaturated terpenes that have been artificially hydrogenated. Suitable saturated terpenes may be monocyclic such as p-Menthane and m-Menthane; bicyclic such as Pinane, Camphane, Carane and Thujane; acyclic such as Dimenthyloctane; or tricyclic such as Tricyclene and Cyclofenchene.

Because naturally occurring saturated terpenes are somewhat rare, the most economical approach is to hydrogenate commercially available unsaturated terpenes. Hydrogenation is an old and well known chemical reaction as pointed out in *Organic Chemistry*, Third Edition, pages 64–67. Thus, hydrogenating unsaturated terpenes is well within the ability of those skilled in the art.

The saturated terpene is used as a substantial percentage of the additive in an amount sufficient to produce low toxicity drilling fluids that pass LC-50 tests. Thus, at least 30% by volume, preferably 50% by volume and up to 100% by volume saturated terpenes may be used. Although most of the balance of the additive is typically unsaturated terpene, other materials may also be employed, such as oils, dyes, fragrants if it is desired to mask the odor of fragrant terpenes or if a non-fragrant terpene is used, and the like. Of course, the terpene may be mixed with more-or-less neutral diluents or other materials, such as oils or other lubricants that do not substantially offset the advantages of the saturated or unsaturated terpenes.

Preferably, the additive of this invention is simply poured or injected into a more-or-less conventional drilling mud.

When added to a water based drilling fluid, the additive is present in an effective amount in the range of 1–8% by volume. The performance of the mud system is monitored to use the least amount of the additive commensurate with effectiveness. Usually, the amount of additive lies in the range of 1–3% by volume.

I claim:

1. A water based drilling fluid comprising a weight material, a fluid loss additive, a viscosifier and 1–8% of (a) 30–100 parts by volume saturated terpene and (b) 0–70 parts by volume unsaturated terpene.

2. The drilling fluid of claim 1 having an LC-50 greater than 30,000 ppm.

3. The drilling fluid of claim 1 having an LC-50 greater than 100,000 ppm.

4. The drilling fluid of claim 1 wherein the saturated terpene is selected from the group consisting of acyclic terpenes, monocyclic terpenes, bicyclic terpenes, tricyclic terpenes and mixtures thereof.

5. The drilling fluid of claim 4 wherein the saturated terpene is p-Menthane.

6. The drilling fluid of claim 4 wherein the saturated terpene is m-Menthane.

7. The drilling fluid of claim 4 wherein the saturated terpene is Pinane.

8. The drilling fluid of claim 4 wherein the saturated terpene is Camphane.

9. The drilling fluid of claim 4 wherein the saturated terpene is Carane.

10. The drilling fluid of claim 4 wherein the saturated terpene is Thujane.

11. The drilling fluid of claim 4 wherein the saturated terpene is Dimenthyloctane.

12. The drilling fluid of claim 4 wherein the saturated terpene is Tricyclene.

13. The drilling fluid of claim 4 wherein the saturated terpene is Cyclofenchene.

14. A water based drilling fluid comprising a weight material, a viscosifier and 1–8% terpene of which at least 30% by weight is saturated terpene, the drilling fluid having an LC-50 greater than 30,000 ppm in a test published in the Federal Register, Volume 50, No. 165, Aug. 26, 1985 (34627–34636).

15. The drilling fluid of claim 14 wherein the LC-50 is greater than 100,000 ppm.

16. The drilling fluid of claim 1 wherein the weight material is selected from the group consisting of barium sulphate and hematite.

17. The drilling fluid of claim 1 wherein the viscosifier is selected from the group consisting of bentonite and polymer.

* * * * *